Feb. 16, 1926. 1,573,003
N. JAPOLSKY ET AL
INSTALLATION FOR OPERATING RECIPROCATING ELECTRIC MOTORS
Filed March 19, 1923   3 Sheets-Sheet 2
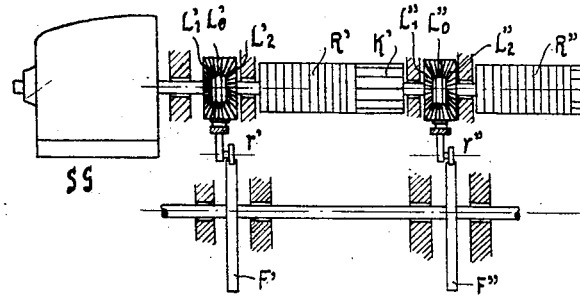
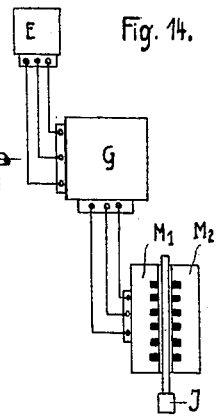
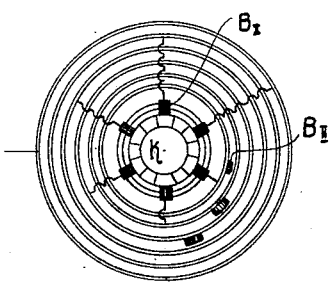
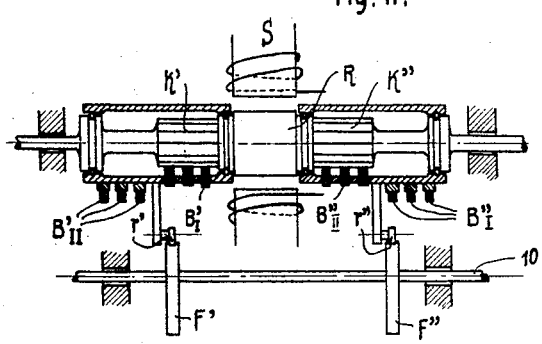
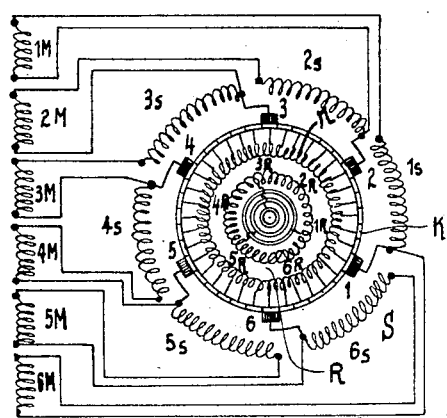

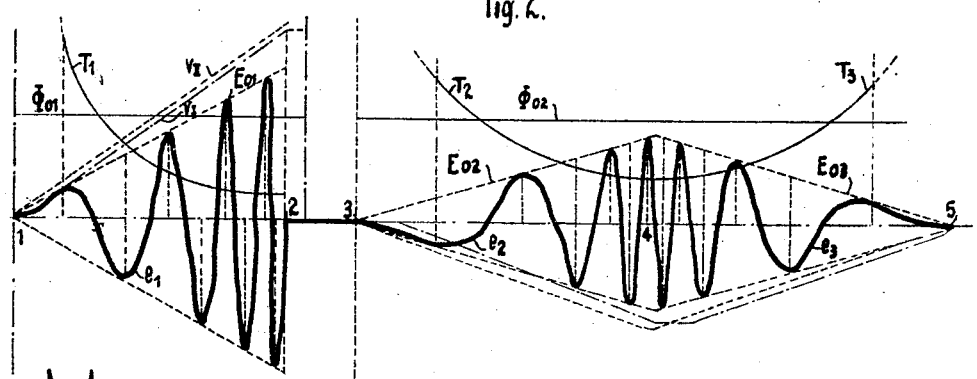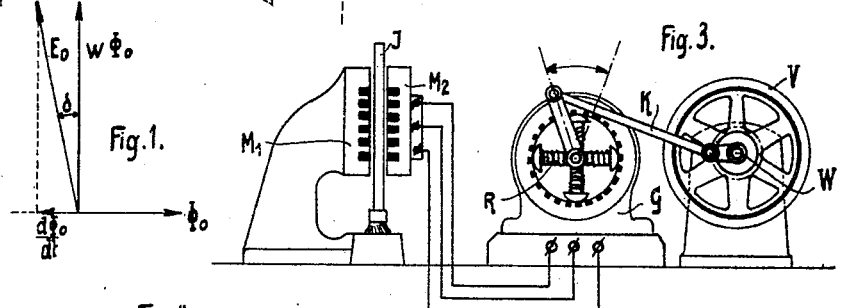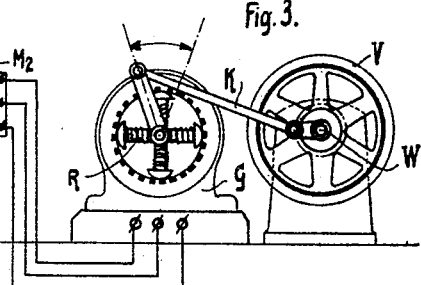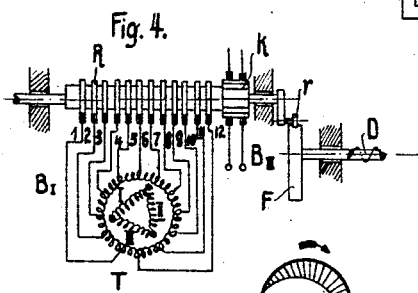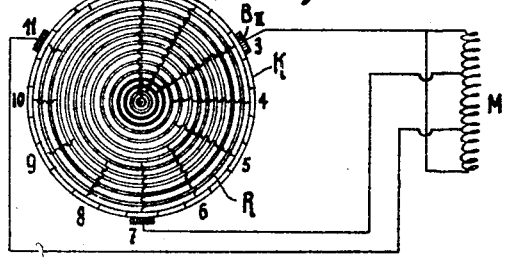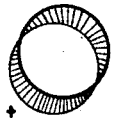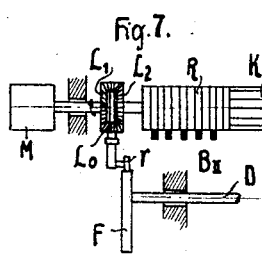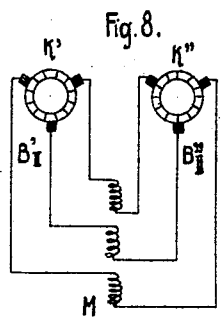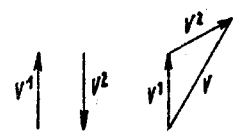

Feb. 16, 1926. 1,573,003
N. JAPOLSKY ET AL
INSTALLATION FOR OPERATING RECIPROCATING ELECTRIC MOTORS
Filed March 19, 1923  3 Sheets-Sheet 3

Inventors
N. Japolsky
M. Kostenko
By Mark & Clerk
Attys

Patented Feb. 16, 1926.

1,573,003

UNITED STATES PATENT OFFICE.

NICOLAS JAPOLSKY AND MICHAEL KOSTENKO, OF LONDON, ENGLAND.

INSTALLATION FOR OPERATING RECIPROCATING ELECTRIC MOTORS.

Application filed March 19, 1923. Serial No. 626,196.

*To all whom it may concern:*

Be it known that NICOLAS JAPOLSKY and MICHAEL KOSTENKO, citizens of the Republic of Russia, residing at London, England, have invented certain new and useful Improvements in Installations for Operating Reciprocating Electric Motors, of which the following is a specification.

This invention relates to improvements in electro-magnetic installations for operating a reciprocating working element.

The present invention consists in an improved electro-magnetic installation for operating a reciprocating working element, in which said working element comprises an armature which is acted upon by a moving magnetic field produced by a stationary multiphase winding, while acceleration is imparted to the said magnetic field by continuously varying the periodicity of the alternating electromotive force applied to the said multi-phase winding.

The invention further consists in that, with a view to avoiding too great a variation in the strength of the moving magnetic field, a suitable variation is also effected in the amplitude of the alternating electro-motive force, as well as in the periodicity.

The method of working of the improved installation, together with various constructional forms, are diagrammatically illustrated in the accompanying drawings in which:—

Fig. 1 represents the phase relations between a varying alternating magnetic field and the electromotive force required to cause it.

Fig. 2 illustrates the variation in the voltage that is to be applied to a multiphase winding in order to produce a moving magnetic field suitable for imparting a reciprocating motion to a working element such as a drop-hammer or pile-driver.

Figure 13:
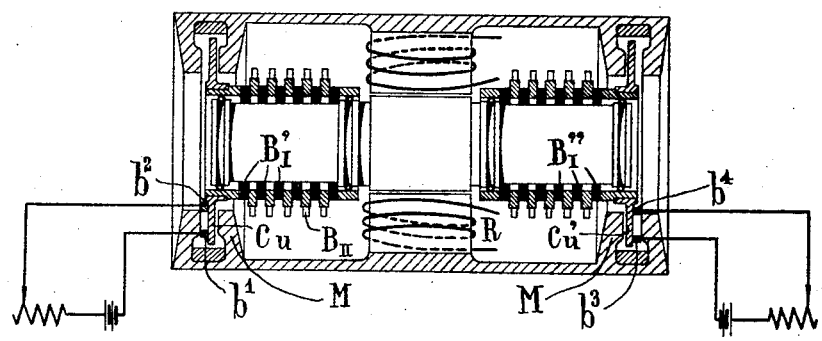

Fig. 3 diagrammatically illustrates one form of a complete installation for operating a working element such as a drop hammer.

Fig. 4 shows an apparatus for converting a multiphase alternating current system of constant periodicity into a multiphase alternating current system of continuously varying periodicity; said mechanism comprising slip rings and a commutator.

Fig. 5 diagrammatically illustrates the electrical connections of the slip rings and the commutator shown in Fig. 4 to the stationary multiphase winding which operates the reciprocating working element.

Fig. 6 is a diagram illustrating the voltage at each point of the commutator shown in Figs. 4 and 5.

Fig. 7 represents a modified form of the apparatus shown in Fig. 4.

Fig. 8 represents an installation for converting a multiphase alternating current system of constant periodicity and amplitude into a multiphase alternating current system of continuously varying periodicity and amplitude, said installation comprising two sets of slip rings and commutators connected similarly to those illustrated in Figs. 4 to 7.

Fig. 9 illustrates the phase relations of the voltage obtained from each of the commutators indicated in Fig. 8.

Fig. 10 shows an arrangement for driving the commutators shown in Fig. 8.

Fig. 11 represents a modification of the installation shown in Fig. 8 in which, instead of the speed of the commutators being continuously varied, the brushes in contact with the commutators are caused to rotate at continuously varying speeds, said brushes being connected to slip rings against which bear other fixed brushes for leading the current to the stationary multiphase winding.

Fig. 12 diagrammatically illustrates the electrical connections between the slip rings and the fixed and moving brushes in Fig. 11.

Fig. 13 represents a modification of the installation illustrated in Fig. 11, in which the continuously varying speed of the moving brushes is obtained by electrical means instead of mechanical means.

Fig. 14 diagrammatically illustrates another form of installation for operating a working element such as a drop-hammer, the variation of periodicity and amplitude being obtained by varying the speed of a small exciting dynamo.

Fig. 15 shows the electrical connections for the installation represented in Fig. 14.

In Fig. 1 $\Phi_0$ is the instantaneous value of the tensor of the vector whose projection upon a fixed axis represents the magnetic flux due to the current flowing in one phase of a multiphase winding. This vector, as usual with alternating currents, is assumed to be rotating counter-clockwise with an angular velocity $\omega$. It is also assumed that the tensor $\Phi_0$ of this magnetic flux vector is not of constant magnitude, but is continuously varying at the rate $$\frac{d\Phi_0}{dt}$$

Then the total variation in the magnetic flux vector will be obtained by compounding two vectors, the vector $\omega\Phi_0$, which corresponds to the angular velocity $\omega$ of the magnetic flux vector and which is 90° in front of $\Phi_0$, and the vector $$\frac{d\Phi_0}{dt}$$

which is in the opposite direction to $\Phi_0$. The resultant vector will be inclined at some angle $\delta$ in front of the vector $\omega\Phi_0$, provided that $$\frac{d\Phi_0}{dt}$$

is negative. The electro-motive force $E_0$ which must be applied in order to cause the said magnetic flux $\Phi_0$ will coincide with said resultant vector in phase and will be proportional to it in magnitude.

Usually as hereinafter shown $$\frac{d\Phi_0}{dt}$$

is small compared with $\omega\Phi_0$ and consequently $\delta$ is small also.

The other phases of the multiphase winding have magnetic fluxes and electromotive forces corresponding to those shown in Fig. 1, but their phase angles are relatively advanced or retarded by 120° in the case of a three phase winding, and so on.

It will be understood that the varying magnetic fluxes of the different phases will combine into a resultant magnetic field which moves in space.

It is this resultant magnetic field which is utilized to impart motion to a reciprocating working element, and it is clear that the best efficiency will be realized by causing this magnetic field to be substantially constant in magnitude and to move with a substantially constant acceleration.

The speed of this resultant magnetic field will correspond to $\omega$ the angular velocity of the rotating vectors, and since the resultant magnetic field is to move with an acceleration, then $\omega$ will not be constant but must be an increasing quantity. Also, since this resultant magnetic field is to be of substantially constant magnitude, it follows that the amplitudes or tensors of the various component fluxes $\Phi_0$ will also be constant, that is $\Phi_0$ will not vary with the time, and so incidentally $$\frac{d\Phi_0}{dt}=0$$

Hence $E_0$, the vector representing the electromotive force to be applied to any one phase of the winding, will rotate with continuously increasing angular velocity and will also simultaneously increase in magnitude.

This variation of the electromotive force which is to be applied to any one phase of the multiphase winding is more clearly represented in Fig. 2, in which horizontal distances represent the time, and vertical distances represent the instantaneous values of the various quantities involved.

The time is divided into four periods 1—2, 2—3, 3—4, and 4—5. Between 1—2 the instantaneous value of the voltage applied to one of the phases of the multiphase winding is represented by the curve $e_1$ shown as a thick wavy line. It will be noticed that this curve is of continuously increasing amplitude and continuously increasing periodicity.

The dotted straight line $E_{01}$ represents the continuously increasing amplitude of this voltage $e_1$, while the curved full line $T_1$ represents the time of a period i. e.

$$T_1 = \frac{1}{\sim}$$

The constant magnitude of the resultant magnetic field is represented by $\Phi_{01}$. The dotted straight line $v_{11}$ represents the velocity of this resultant magnetic field, and the dot-and-dash line $v_1$ represents the velocity of the working element. It is assumed that the slip between this working element and the moving magnetic field is comparatively small.

At the point 2 the current is cut off and between 2 and 3 the working element moves under the action of its own inertia, and does the mechanical work required of it, such as pile driving.

During the time 3—4—5 the working element is returned to its initial position. Between 3 and 4 it moves with continuously increasing velocity and between 4 and 5 with continuously decreasing velocity. Here $e_2$ and $e_3$ correspond to $e_1$ and represent the instantaneous value of the voltage applied to any one phase of the winding. The dotted lines $E_{02}$, $E_{03}$ correspond to $E_{01}$ and represent the varying amplitude of this voltage. The full line $T_2$, $T_3$ coresponds to $T_1$ and represents the time of a period, that is the inverse of the periodicity. It will be seen that the periodicity and amplitude of this voltage continuously increases from 3—4, while it continuously decreases from 4 to 5. The straight line $\Phi_{02}$ corresponds to $\Phi_{01}$ and represents the constant magnitude of the resultant magnetic field.

The lower dotted line represents the velocity of this magnetic field, and the dot-and-dash line represents the velocity of the working element, the slip being assumed to be comparatively small as before.

It is to be understood that the voltage variation applied to the multi-phase winding need not be exactly that indicated in Fig. 2, as a variation of voltage approximating to this ideal variation will be sufficient for practical purposes.

The remaining drawings illustrate various installations for obtaining a variation of voltage approximating to that illustrated in Fig. 2.

Fig. 3 shows an installation for operating a power hammer. The working element or hammer J is moved under the influence of the moving magnetic field produced by the alternating current in the fixed multi-phase winding $M_1$ $M_2$.

The polyphase current for this winding $M_1$ $M_2$ is supplied by the stator winding of the alternator G, whose rotor R is reciprocated backwards and forwards. This is effected by connecting a crank upon the rotor R through a connecting rod K to a shorter crank upon a shaft W which continuously rotates. A flywheel V is mounted upon the shaft W.

It will be seen that the polyphase current supplied by the stator winding of the alternator G will vary in periodicity and in voltage according to the speed of the rotor element R.

This variation will correspond approximately with the variation required according to Fig. 2, and hence the magnetic field produced by the windings $M_1$ $M_2$ will be substantially constant in magnitude and will move with substantially constant acceleration, thus also causing the hammer J to move with substantially constant acceleration. In order to more accurately approximate to the variation of voltage required, a cam is mounted upon the rotating shaft W and this cam is arranged to vary the resistance of a rheostat controlling the current flowing in the magnets of the rotor R.

Fig. 4 shows a frequency transformer in which the element which is to move at varying speeds is comparatively light. In this figure T is an ordinary stationary phase-transformer in which the primary winding has three phases I, II and III while the secondary winding has twelve phases. Each of these twelve phases is connected to one of a series of slip rings R mounted upon a rotating element which also carries a commutator K.

As represented in Fig. 5, each of these slip rings R is electrically connected to one of the segments of the commutator K, which acts to lead the current to three brushes $B_{11}$ electrically connected to the stationary multiphase winding M for actuating the working element.

The element containing the commutator K and slip rings R is caused to rotate at continuously varying speed by being driven, through a roller $r$ and a suitable cam F, from a shaft D which rotates at constant speed.

In Fig. 6 the circle drawn as a heavy line represents the circumference of the commutator K, while the radial lines drawn from this circle to the thin line circle indicate the magnitude of the electric potentials at each point of the commutator. Relative to the heavy circle representing the commutator K, this thin circle rotates at a speed corresponding to the periodicity of the current in the transformer T.

But the periodicity of the current supplied to the brushes $B_{11}$ (Fig. 4) will depend on the absolute speed of rotation of the thin line circle (Fig. 6) and so will depend jointly on the periodicity of the current supplied to the transformer T, and on the speed of rotation of the commutator K.

In this case the voltage of the current supplied to the brushes $B_{11}$ will be constant, independent of the speed of rotation of the commutator K.

Fig. 7 represents an alternative arrangement for imparting a continuously varying speed to the commutator K in Fig. 4.

The element containing the slip rings R and commutator K is driven by the alternator M through the intermediary of the differential gearing $L_0$ $L_1$ $L_2$, the wheel $L_1$ being connected to the alternator M and the wheel $L_2$ to the commutator K. The wheel $L_0$ of the differential gear is driven at continuously varying speeds through the medium of the roller $r$ and the cam F, which is mounted upon the shaft D which rotates at constant speed. The alternator M is electrically connected to the transformer T represented in Fig. 4.

This mechanism (Fig. 7) is such that if the wheel $L_0$ of the differential gearing does not rotate (so that, as is known, the speeds of the wheels $L_1$ and $L_2$ are equal but they rotate in opposite directions) then the commutator K rotates at a speed equal to the velocity of the potential curve relative to the commutator (Fig. 6) but in the contrary direction.

Consequently the absolute velocity of the potential curve (Fig. 6) is zero, and so a continuous direct current will be caused to pass through the brushes $B_{11}$ (Figs. 4 and 5).

If the wheel $L_0$ is rotated in the opposite direction to the rotation of the commutator, the angular velocity of the commutator will be decreased by an amount equal to twice the angular velocity of the wheel $L_0$. The potential curve (Fig. 6) then has an absolute velocity equal to twice the angular velocity of the wheel $L_0$, and the periodicity of the current through the brushes $B_{11}$ also corresponds to twice the angular velocity of $L_0$.

In this arrangement also, the amplitude of the voltage obtained is constant, the periodicity alone being varied.

Fig. 8 represents an installation in which both the amplitude and the periodicity of the voltage may be varied. In this figure, each phase of the multiphase windings is connected between two brushes $B_{11}^1$ and $B_{11}^{11}$ which respectively make contact with two different commutators $K^1$ and $K^{11}$.

The commutators $K^1$ and $K^{11}$ are connected with a source of alternating current of constant periodicity similar to the commutator $K$ in Figs. 4 and 7, while these commutators $K^1$ and $K^{11}$ are adapted to be displaced relatively to one another.

It will be seen that the varying voltage in each phase of the winding M is represented by the vector $V$ which is equal to the geometrical difference of the vectors $V_1$ and $V_2$ (Fig. 9) representing the varying potentials at the brushes to which this phase is connected. The voltage applied to each phase of the winding M can therefore be caused to continuously vary both in magnitude and also in periodicity.

If these brushes are on the opposite phases of the potential curve (Fig. 6), the commutators $K^1$ and $K^{11}$ being electrically displaced by 180° from each other, then the vector $V$ is equal to twice the vector $V^1$ or $V^2$.

Fig. 10 represents an arrangement suitable for driving the two commutators $K^1$ and $K^{11}$ in Fig. 8.

The frequency transformer $R^1$ $K^1$ is connected with the alternator S G by means of a differential gearing $L_0^1$, $L_1^1$, $L_2^1$ similar to the connection of the commutator $K$ to the alternator M in Fig. 7.

A similar differential gearing $L_0^{11}$ $L_1^{11}$ $L_2^{11}$ connects the mechanical frequency transformer $R^1$ $K^1$ with the second mechanical transformer $R^{11}$, $K^{11}$.

The elements $L_0^1$ and $L_0^{11}$ of these differential gears are driven by means of the rollers $r^1$, $r^{11}$ from the cams $F^1$, $F^{11}$ which are mounted upon a shaft rotating at a constant speed.

The cam $F^1$ is so chosen that the commutator $K^1$ is rotated at a speed which continuously varies according to the required periodicity of the current to be supplied to the winding M. The cam $F^{11}$ is so chosen as to cause the relative angular relation between the commutators $K^{11}$ and $K^1$ to continuously vary according to the required amplitude of the voltage of the current supplied to the winding M.

It will be seen that by suitably designing the cams $F^1$, $F^{11}$ the periodicity and amplitude of the voltage can be caused to vary so that the instantaneous value of the voltage varies as shown in Fig. 2, the magnetic field produced being consequently of substantially constant magnitude.

Fig. 11 represents an alternative installation for obtaining a voltage of varying amplitude and periodicity.

S represents stationary field magnets surrounding an armature R which rotates at substantially constant speed. Commutators $K^1$ and $K^{11}$ are rigidly connected to the armature R and are electrically connected with the armature windings in the usual manner.

A set of brushes $B_1^1$ contacting with the commutator $K^1$ is mounted in an independently rotatable element which also contains a series of slip rings. Each brush is electrically connected to its corresponding slip ring as diagrammatically indicated in Fig. 12.

A set of fixed brushes $B_{11}^1$ are arranged to make contact with these slip rings.

The sets of brushes $B_1^{11}$ are similarly mounted in an independently rotatable element so as to contact with the commutator $K^{11}$ and these brushes are also in electrical contact with slip rings, which lead the current on to fixed brushes $B_{11}^{11}$.

The various phases of the stationary multiphase winding are connected between these brushes $B_{11}^1$ and $B_{11}^{11}$ in the same way as indicated in Figure 8.

The elements carrying the sets of brushes $B_1^1$ $B_1^{11}$ are driven at suitable continuously varying speeds through the medium of the rollers $r^1$ and $r^{11}$ and the cams $F^1$ and $F^{11}$ mounted upon the shaft 10 which is rotated at constant speed.

Fig. 13 represents an installation similar to Fig. 12, but the elements carrying the sets of brushes $B_1^1$, $B_1^{11}$ are here driven by electrical means, instead of through the cams $F^1$ and $F^{11}$. The element carrying the brushes $B_1^1$ has attached to it a copper disc $C_u$, while the other element carrying the brushes $B_1^{11}$ is connected to a similar copper disc $C_u^1$.

This copper disc $C_u$ extends into the annular gap between the north and south poles of a magnet M. Continuous current is supplied to the copper disc through the brushes $b^1$ and $b^2$. It will be noticed that the copper disc $C_u$ is also acted upon by eddy currents induced by its rotation.

By varying the current supplied through the brushes $b^1$ and $b^2$, the motion of the copper disc $C_u$ may be accelerated or retarded thereby varying the speed of rotation of the brush holding element which carries the brushes $B_1^1$. Similarly the speed of rotation of the other brush holding element which carries the brushes $B_1^{11}$ can be varied by means of another copper disc $C_u^1$ similar to $C_u$ with brushes $b^3$ and $b^4$ similar to $b^1$ and $b^2$. In this way the speeds of the two brush holding elements can be varied as desired, and thus the voltage obtained may be varied in periodicity and in amplitude.

In all the constructional forms hitherto described, the changes in the voltage have been effected, either by the use in an alternator of a rotor moving at varying velocity, or by the use of commutators or brush holders moving with varying velocity. In view of the fact that the reciprocating machines energized are usually very powerful and therefore require correspondingly powerful generators for the electric current used, such constructional forms cannot be regarded as very practical.

In these cases the alternating current machine speed regulating system according to the specification of our United States application No. 595,003 may be used with advantage. This generator is a commutator-generator with alternating current excitation, in which the periodicity of the exciting current determines the periodicity of the working current with a constant speed of revolution of the generator. In this case the dimensions of the exciter engine are considerably smaller than those of the generator.

Fig. 14 shows the complete installation of an alternating-current commutator-generator excited from a separate exciting machine applied to energize a reciprocating machine. The exciting machine produces a current with variable periodicity, which supplies the alternating-current generator G, rotating at a constant speed of revolution. The periodicity of the multiphase current produced by this alternator for the supply of the armature $M_1$ and $M_2$ in the reciprocating machine also varies, and this current produces in the reciprocating machine a magnetic field of variable velocity, which, in its turn, operates at variable velocity the inductor J holding the hammer head.

Fig. 15 shows the electric connections of the above mentioned alternator G, with excitation applied to the rotor. R represents this rotor comprising both the commutator K and a separate exciting winding $1_R$, $2_R$, $3_R$, $4_R$, $5_R$, $6_R$, to which triple-phase current from the exciting machine E is conducted by contact-rings.

$1_s$, $2_s$, $3_s$, $4_s$, $5_s$, $6_s$, are the phases of the stator winding on the alternate-current generator $1_m$, $2_m$, $3_m$, $4_m$, $5_m$, $6_m$ are the phases of the windings $M_1$ $M_2$ of the reciprocating machine. The segments of the commutator K are connected to points of an enclosed winding $r$ on the rotor.

In the reciprocating machines hereinbefore represented, the working element has been shown as adapted to move in a straight line, but the motion of the working element is not necessarily confined to a linear motion.

What we claim is:—

1. An electromagnetic installation for operating a reciprocating working element, comprising an armature forming part of said reciprocating working element, a stationary element, a multiphase winding thereon adapted, when supplied with multiphase alternating current, to produce a moving magnetic field acting upon the armature, and means for applying to the multiphase winding a multiphase alternating electromotive force of varying periodicity, in order to impart acceleration to the said moving magnetic field.

2. An electromagnetic installation for operating a reciprocating working element, comprising an armature forming part of said reciprocating working element, a stationary element, a multiphase winding thereon adapted, when supplied with multiphase alternating current, to produce a moving magnetic field acting upon the armature, and means for applying to the multiphase winding a multiphase alternating electromotive force, whose periodicity is continuously varied in order to impart acceleration to the moving magnetic field, and whose amplitude is suitably continuously varied, with a view to avoiding excessive variations in the strength of the said moving magnetic field.

3. An electromagnetic installation for operating a reciprocating working element, comprising an armature forming part of said reciprocating working element, a stationary element, a multiphase winding thereon adapted, when supplied with multiphase alternating current, to produce a moving magnetic field acting upon the armature, and means for applying to the multiphase winding a multiphase alternating electromotive force, whose periodicity is continuously varied in order to impart acceleration to the moving magnetic field, and whose direction is changed in order to cause the magnetic field to move alternately in opposite directions, so as to impart a forced reciprocating motion to the working element.

4. An electromagnetic installation for operating a reciprocating working element, comprising an armature forming part of said reciprocating working element, a stationary element, a multiphase winding thereon adapted, when supplied with multiphase alternating current, to produce a moving magnetic field acting upon the armature, a source of multiphase alternating electromotive force, a rotary commutator interposed between the said source of alternating electromotive force and the stationary multiphase winding, and means for driving the commutator at continuously varying speeds, in order to impart acceleration to the said moving magnetic field.

5. An electromagnetic installation for operating a reciprocating working element, comprising an armature forming part of said reciprocating working element, a stationary element, a multiphase winding thereon adapted, when supplied with multiphase alternating current, to produce a moving magnetic field acting upon the armature, a source of multiphase alternating electromotive force, two rotary commutator devices electrically connected thereto, two sets of brushes between which are interposed the various phases of the stationary multiphase winding, each set being also in electrical contact with its corresponding rotary commutator device, and means for suitably varying the speeds of the commutator devices, whereby the amplitude and periodicity of the electromotive force applied to the stationary multiphase winding can be caused to vary as desired, in order to impart acceleration to the moving magnetic field and to avoid excessive variation in the strength of the same.

6. An electromagnetic installation for operating a reciprocating working element as claimed in claim 5, comprising electrical means for varying the speeds of the commutator devices.

In testimony whereof we hereunto affix our signatures.

NICOLAS JAPOLSKY.
MICHAEL KOSTENKO.